US009176991B2

(12) United States Patent
Collins et al.

(10) Patent No.: US 9,176,991 B2
(45) Date of Patent: Nov. 3, 2015

(54) STORING PHOTOGRAPHIC METADATA FOR SCENE REPRODUCTION (71) Applicant: International Business Machines Corporation, Armonk, NY (US)

(72) Inventors: Michael C. Collins, Raleigh, NC (US); John F. Kelley, Clarkesville, GA (US); Douglas E. Lhotka, Highlands Ranch, CO (US); Todd P. Seager, Orem, UT (US)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 14/085,932

(22) Filed: Nov. 21, 2013

(65) Prior Publication Data

US 2015/0139570 A1    May 21, 2015

(51) Int. Cl.
*G06K 9/54* (2006.01)
*G06F 17/30* (2006.01)

(52) U.S. Cl.
CPC ................. *G06F 17/30265* (2013.01)

(58) Field of Classification Search
CPC . G06K 9/00684; G06K 9/622; G06K 9/6255; H04N 5/225; H04N 5/23203; H04N 5/23222; H04N 5/77; G06T 5/00; G06T 11/00; G06T 11/001; G06T 11/60; G06F 17/30017; G06F 17/30038; G06F 17/30056; G06F 17/30064; G06F 17/30244; G06F 17/30265; G06F 17/30274; G06F 17/3089; G06F 2216/17; G01C 11/00; G01C 15/00; G06Q 10/00; G06Q 10/10; G06Q 30/00; H04L 65/4069; H04L 65/60; H04L 67/1095; H04L 67/15; G03B 15/00; G03B 17/20; G03B 17/24
See application file for complete search history.

(56) References Cited

U.S. PATENT DOCUMENTS

| 7,415,662 | B2 * | 8/2008 | Rothmuller et al. ......... 715/200 |
| 7,801,439 | B2 | 9/2010 | Nagata et al. |
| 7,805,066 | B2 | 9/2010 | Wexler et al. |
| 8,228,413 | B2 | 7/2012 | Ellenby et al. |
| 8,314,569 | B2 | 11/2012 | Adamson et al. |
| 8,869,058 | B1 * | 10/2014 | De et al. ....................... 715/771 |
| 2007/0253699 | A1 | 11/2007 | Yen et al. |

(Continued)

FOREIGN PATENT DOCUMENTS

| JP | 2011049630 A | 3/2011 |
| JP | 2012163846 A | 8/2012 |
| WO | 2006100650 A2 | 9/2006 |

OTHER PUBLICATIONS

Bourke, et al., "The Social Camera: Recommending Photo Composition Using Contextual Features", CARS-2010, Sep. 26, 2010, Barcelona, Spain.

(Continued)

*Primary Examiner* — Jose Couso
(74) *Attorney, Agent, or Firm* — Maeve McCarthy; Jinesh Patel (57) ABSTRACT

In an approach for collecting and storing photographic metadata, a computer receives a file containing an image. The computer receives photographic metadata from one or more photographic devices. The one or more photographic devices include at least one or more illumination devices. The one or more photographic devices are utilized to create the image. The received photographic metadata includes at least specifications of the one or more photographic devices. The computer stores the received photographic metadata in association with the received file.

17 Claims, 4 Drawing Sheets

(56) References Cited

U.S. PATENT DOCUMENTS

| | | |
|---|---|---|
| 2009/0136225 A1 | 5/2009 | Gai et al. |
| 2011/0141326 A1 | 6/2011 | Ishida |
| 2012/0033959 A1 | 2/2012 | King |
| 2012/0213407 A1 | 8/2012 | Haikin et al. |
| 2012/0248992 A1 | 10/2012 | Jeon et al. |
| 2013/0028469 A1 | 1/2013 | Lee et al. |
| 2013/0077882 A1 | 3/2013 | Venkataraman et al. |
| 2013/0088486 A1 | 4/2013 | Yoon et al. |
| 2013/0150124 A1 | 6/2013 | Kim et al. |

OTHER PUBLICATIONS

Fujimoto, et al, "One Idea on a Three Dimensional Measuring System Using Light Intensity Modulation", International Journal of Control, Automation, and Systems, vol. 3, No. 1, pp. 130-136, Mar. 2005.

* cited by examiner

STORING PHOTOGRAPHIC METADATA FOR SCENE REPRODUCTION

FIELD OF THE INVENTION

The present invention relates generally to the field of photography, and more particularly to photographic data processing.

BACKGROUND OF THE INVENTION

Light is the building block of every photograph, and today there are tools that allow artists to shape light creatively. The proper illumination of a subject being photographed is often important in the production of high quality photography, and photographers utilize a wide variety of lighting devices in achieving the desired illumination. Artificial illumination includes direct lighting and indirect lighting, and a variety of light reflectors, flash units, strobes, and other light sources are employed to achieve the desired result. Typically, the light source is stationary with respect to the subject being photographed and the camera, and the intensity of the illumination, the distance of the illuminating devices from the subject, the reflective quality of the subject, the aperture setting of the camera, and the lens to be used, all affect the illumination characteristics with respect to the end result achieved, and photographers often go to great lengths to achieve the desired lighting effect.

Digital cameras are used by a growing number of consumer and professional photographers. These cameras use an image sensor to capture images and digitally process the captured image to produce a digital image file, which is stored in a digital memory. Digital image files originating from a digital camera include the digital images and may also include metadata generated from the digital camera. Image metadata is non-picture information embedded in the digital image file in addition to the actual image data. The metadata can be relevant information fundamental to the camera's function at the time of image capture, such as shutter speed, aperture, focal length, date, time, etc.

SUMMARY

Embodiments of the present invention disclose a method, computer program product, and system for collecting and storing photographic metadata. The method includes a computer receiving a file containing an image. The computer receives photographic metadata from one or more photographic devices. The one or more photographic devices include at least one or more illumination devices. The one or more photographic devices are utilized to create the image. The received photographic metadata includes at least specifications of the one or more photographic devices. The computer stores the received photographic metadata in association with the received file.

DETAILED DESCRIPTION

A photographer envisions an image. Composition is determined, subject matter is staged, and lighting is arranged. These elements can be changed many times to obtain the desired image. Documenting an image configuration for each iteration during image capture is often tedious. There may be many different devices used during image capture, such as illumination devices, modifiers, props, and each device may have a unique configuration for each image. Each unique configuration can be referred to as metadata. Without thorough documentation of the metadata, re-creating the image at a later date can be difficult.

Embodiments of the present invention recognize efficiency could be gained if image metadata, especially with respect to the illumination of the image, could be collected and stored for re-use. Embodiments of the present invention store metadata from the photographic image as well as the illumination and modification of that image. Embodiments of the present invention also utilize stored metadata to re-create a photographic setup. Implementation of embodiments of the invention may take a variety of forms, and exemplary implementation details are discussed subsequently with reference to the Figures.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (note: the term(s) "Java" may be subject to trademark rights in various jurisdictions throughout the world and are used here only in reference to the products or services properly denominated by the marks to the extent that such trademark rights may exist), Smalltalk®, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
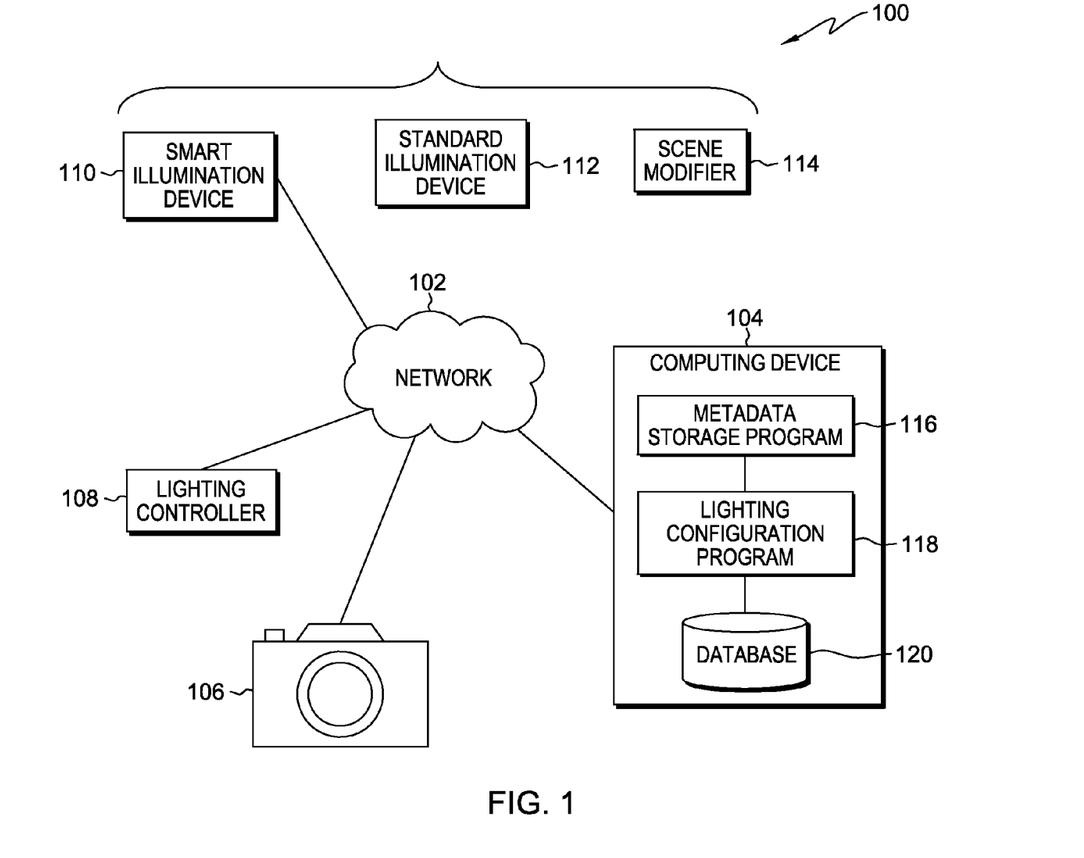
FIG. 1 is a functional block diagram illustrating a photographic setup environment, in accordance with an embodiment of the present invention.

The present invention will now be described in detail with reference to the Figures. FIG. 1 is a functional block diagram illustrating a photographic setup environment, generally designated 100, in accordance with one embodiment of the present invention. The term photographic can apply to both still and moving images. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

In the illustrated embodiment, photographic setup environment 100 includes computing device 104, camera 106, lighting controller 108, smart illumination device 110, standard illumination device 112, and scene modifier 114. Computing device 104, camera 106, lighting controller 108, and smart illumination device 110 are all interconnected over network 102. Network 102 can be, for example, a local area network (LAN), a wide area network (WAN) such as the Internet, or a combination of the two, and can include wired, wireless, or fiber optic connections. In general, network 102 can be any combination of connections and protocols that will support communications between computing device 104, camera 106, lighting controller 108, and smart illumination device 110.

Scene modifier 114 is an object capable of modifying a photographic setup. Examples of a scene modifier include items such as gels or filters that modify illumination devices. A color gel or color filter, also known as lighting gel or simply gel, is a transparent colored material used in photography to color light and for color correction. Modern gels are thin sheets of polycarbonate or polyester placed in front of a lighting fixture in the path of the beam. Attributes of gels include color code and transmissive index. Other examples of scene modifiers are a "soft box", an umbrella reflector, a prop, and a subject. A soft box is an enclosure around a light bulb comprising reflective side and back walls and a diffusing material at the front of the light. The sides and back of the box are lined with a bright surface, such as an aluminized fabric surface or an aluminum foil, to act as an efficient reflector. An umbrella reflector is an umbrella that is metallized on the inside and used for bouncing off light in a photographic setup to create soft indirect light. A prop for the scene can be, for example, a piece of furniture or a plant. A subject for the scene can be, for example, a person or a product. In the depicted environment, scene modifier 114 does not communicate over network 102. In another embodiment, an electronic identification tag may be attached to scene modifier 114 to enable communication capabilities similar to that of smart illumination device 110. In another embodiment, a scene modifier may have an embedded RFID chip or other data storage and transmission device which transmits the scene modifier metadata to smart illumination device 110. Scene modifier metadata may include attributes such as manufacturer, model number, size, color, etc.

Standard illumination device 112 is any photographic illumination device that does not include an embedded electronic device with the capability of collecting lighting metadata at the moment of image capture and/or transmitting lighting metadata over network 102. Standard illumination device 112 may be a strobe light, a static light, a flash, or any illumination device capable of illuminating a photographic setup. In the depicted environment, standard illumination device 112 does not communicate over network 102. In another embodiment, an electronic identification tag may be attached to standard illumination device 112 to enable communication capabilities similar to that of smart illumination device 110.

Smart illumination device 110 may be any illumination device, e.g. strobe light, static light and/or flash, which includes an embedded or attached electronic device with the capability of collecting lighting metadata at the moment of image capture and transmitting the lighting metadata over network 102. As will be appreciated by one skilled in the art, non-static illumination devices are triggered by either a camera or a lighting controller via optics, radio waves and/or cables to illuminate at the moment of image capture. For a smart illumination device, the same trigger indicates the moment to collect and transmit lighting metadata.

Lighting metadata may include attributes such as manufacturer, model number, light intensity, power, duration, orientation, position, location, etc. Smart illumination device 110 may also have the capability of detecting scene modifiers. As discussed in more detail above, scene modifiers are objects or devices capable of modifying a photographic setup, typically with regards to the illumination of the scene.

In an exemplary embodiment, smart illumination device 110 includes a user interface that displays a list of scene modifiers from which the user can select for the current setup. In another embodiment, a scene modifier may have an embedded RFID chip or other data storage and transmission device which transmits the scene modifier metadata to smart illumination device 110. Scene modifier metadata may include attributes such as manufacturer, model number, size, color, etc.

Smart illumination device 110 may also be enabled with the capability of detecting fixed or relative location of smart illumination device 110. In an exemplary embodiment, smart illumination device 110 detects location by the inclusion of a global positioning system (GPS). In another embodiment, the capability of detecting location is enabled by the use of radio/optical triangulation with respect to camera 106 and/or other devices in the photographic setup.

Smart illumination device 110 may also be enabled with the capability to issue an audible or visible cue to the user to indicate various circumstances. For example, smart illumination device 110 may issue a cue to alert the user that smart illumination device 110 is not placed in the correct position relative to previously stored metadata. In another example, smart illumination device 110 may issue a cue to the user to indicate whether or not smart illumination device 110 is included in a pre-set configuration of a photographic setup.

Smart illumination device 110 may also include servos which can adjust for placement along an axis or to zoom a strobe lens. In one embodiment, smart illumination device 110 includes the ability to transmit directions to attached servos in order to activate the servos in lighting supports to raise, lower and/or move smart illumination device 110 to the desired configuration. Smart illumination device 110 may include internal and external hardware components, as depicted and described in further detail with respect to FIG. 4.

Lighting controller 108 may be a desktop computer, a laptop computer, a tablet computer, a specialized computer server, a smartphone, or any other computer system known in the art. In general, lighting controller 108 represents any programmable electronic device or combination of programmable electronic devices capable of executing machine-readable program instructions and communicating with other computing devices via a network, such as network 102.

Lighting controller 108 is enabled with the capability of changing the quality of light of one or more illumination devices in a photographic setup, or shoot, for example, controlling when a strobe light will fire or changing the intensity of a light. Lighting controller 108 may communicate with smart illumination devices using any wireless communications protocol, for example, Bluetooth®, NFC (Near Field Communications) protocols, RFID (radio-frequency identification), Wi-Fi®, or cellular communications.

Lighting controller 108 may also communicate with other devices, such as smart illumination device 110 and standard illumination device 112, using wired communications. Lighting controller 108 may transmit stored settings to one or more illumination devices in the photographic setup. Lighting controller 108 may also receive settings from one or more illumination devices for storing for use at a later time, or for comparison to pre-defined settings for determination of whether the illumination device is set correctly. In some embodiments, lighting controller 108 may include non-volatile memory for storing pre-set conditions.

In the embodiment depicted in FIG. 1, lighting controller 108 is a stand-alone device. In another embodiment, lighting controller 108 may be embedded within the electronics of camera 106. In yet another embodiment, lighting controller 108 may be embedded within the electronics of computing device 104. Lighting controller 108 may include internal and external hardware components, as depicted and described in further detail with respect to FIG. 4.

Camera 106 is a photography device, such as a digital camera, enabled with the capability of communicating with other devices via network 102. Camera 106 may also be a digital camera that resides in a portable electronic device, such as a smartphone. Camera 106 may also be a video camera. Camera 106 is also enabled with the capability of collecting and storing metadata within each image for the purpose of documenting details of the image that was captured. The metadata may include details such as shutter speed, lens, camera location, aperture, focal length, etc.

In one embodiment, camera 106 includes the ability to store metadata received from other devices in a photographic setup, or shoot, in resident memory. For example, camera 106 may receive lighting metadata which may include information such as manufacturer, model number, light intensity, power, orientation, position, location, etc. Camera 106 may include internal and external hardware components, as depicted and described in further detail with respect to FIG. 4.

Computing device 104 may be a desktop computer, a laptop computer, a tablet computer, a specialized computer server, a smartphone, or any other computer system known in the art. In another embodiment, computing device 104 represents a computing system utilizing clustered computers and components to act as a single pool of seamless resources. In general, computing device 104 represents any programmable electronic device or combination of programmable electronic devices capable of executing machine-readable program instructions and communicating with other computing devices via a network, such as network 102. Computing device 104 includes metadata storage program 116, lighting configuration program 118, and database 120. Computing device 104 may include internal and external hardware components, as depicted and described in further detail with respect to FIG. 4.

Metadata storage program 116 resides on computing device 104. In other embodiments, metadata storage program 116 may reside on any other computing device that is accessible to network 102. Metadata storage program 116 receives device metadata captured at the moment of photographic image capture. Device metadata is received from smart illumination devices and from standard illumination devices to which an electronic identification (ID) tag has been attached. Device metadata includes device attributes and configurations associated with a particular photographic image. Metadata storage program 116 is depicted and described in further detail with respect to FIG. 2.

Lighting configuration program 118 resides on computing device 104. Lighting configuration program 118 receives previously stored device metadata and determines whether particular illumination devices, such as smart illumination device 110, and/or scene modifiers are required to be in the current photographic setup based on the received device metadata. If smart illumination device 110 is required to be in the current photographic setup, lighting configuration program 118 configures and activates servos, if included/available, to move smart illumination device 110 to match the configuration in the metadata. Lighting configuration program 118 is depicted and described in further detail with respect to FIG. 3.

Database 120 includes specifications and/or attributes for a plurality of photographic devices and scene modifiers available in the industry that may be chosen to compose a simulated photographic setup. The photographic equipment attributes may include data such as manufacturer, model number, power capability, size, etc., depending on the particular piece of equipment. Database 120 can be updated to include both new photographic equipment that becomes available in the industry and any changes to equipment already listed. Database 120 may also store samples of simulated photographic setups as well as files that include image metadata from actual photographs. In the depicted embodiment, database 120 resides in computing device 104. In another embodiment, database 120 may reside in lighting controller 108. In yet another embodiment, database 120 may reside in camera 106.

Figure 2:
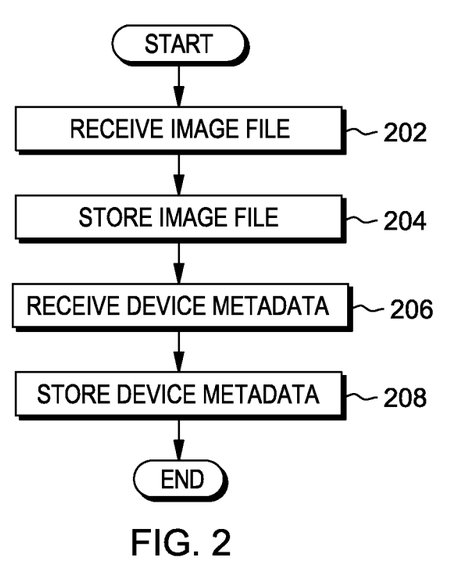
FIG. 2 is a flowchart depicting operational steps of a metadata storage program within the photographic setup environment of FIG. 1, for receiving and storing image metadata, in accordance with an embodiment of the present invention.

FIG. 2 is a flowchart depicting operational steps of a metadata storage program within the photographic setup environment of FIG. 1, for receiving and storing image metadata, in accordance with an embodiment of the present invention. The image may be still or moving. Metadata is transmitted by smart illumination devices and by standard illumination devices to which an electronic ID tag has been attached.

Metadata storage program 116 receives an image file from camera 106 (step 202). When the shutter of camera 106 is triggered, an image file is created. Camera 106 transmits the image file to computing device 104. In an exemplary embodiment, metadata storage program 116 resides on computing device 104 and receives the transmission of the image file from camera 106. In another embodiment, metadata storage program 116 resides on lighting controller 108 and receives the transmission of the image file. In yet another embodiment, metadata storage program 116 resides on camera 106 and receives the transmission of the image file.

Subsequent to receiving an image file, metadata storage program 116 stores the image file (step 204). In an exemplary embodiment, metadata storage program 116 stores the image file in database 120. In another embodiment, metadata storage program 116 stores the image file in memory of lighting controller 108. In yet another embodiment, metadata storage program 116 stores the image file in memory of camera 106.

Metadata storage program 116 receives device metadata (step 206). As described previously, when the shutter of camera 106 is triggered, each device in the photographic setup enabled with the capability of communicating over network 102 transmits metadata associated with the particular image file. The metadata may include fixed position, relative position, lighting attributes and configuration, scene modifier attributes, etc. A smart illumination device, such as smart illumination device 110, detects the fixed location and/or relative location of the smart illumination device through the use of radio/optical triangulation or a global positioning system (GPS).

Triangulation data may be achieved by utilizing a pre-flash from other illumination devices to triangulate relative position. Direction (i.e. north, south, east, west) of the illumination device may be detected by an integrated compass. Orientation (i.e. roll, pitch, yaw) of the illumination device may be detected by integrated levels. Lighting attributes and configuration metadata may include device manufacturer, model number, maximum output, zoom level, intensity, etc.

In an exemplary embodiment, if the photographic setup includes a standard illumination device, such as standard illumination device 112, which can not communicate with metadata storage program 116 via network 102, the device metadata for that device is input by the user at or before the time when the shutter of camera 106 is triggered. Standard illumination device attribute options may be displayed on lighting controller 108 or on computing device 104, or the user may enter the attributes manually.

In another embodiment, metadata storage program 116 may be able to determine attributes, such as relative location and position of a standard illumination device, by utilizing interactions with smart illumination devices that can determine location via radio/optical triangulation or GPS or via relative location within known room dimensions.

Scene modifier attributes may include modifier manufacturer, model number, type (e.g. umbrella, soft box, gel). If the scene modifier is a gel, attributes may also include color code and/or transmissive index. Scene modifier attributes are detected by the smart illumination device via electronic ID tags embedded in the scene modifiers. If scene modifiers do not contain embedded electronic ID tags, the user may select the scene modifier attributes. Scene modifier attribute options may be displayed on the smart illumination device or on lighting controller 108 or on computing device 104.

In an exemplary embodiment, metadata storage program 116 resides on computing device 104 and receives a transmission of device metadata from a smart illumination device. In another embodiment, metadata storage program 116 resides on lighting controller 108 and receives the transmission of device metadata. In yet another embodiment, metadata storage program 116 resides on camera 106 and receives the transmission of device metadata.

Subsequent to receiving the device metadata, metadata storage program 116 stores the device metadata (step 208). In an exemplary embodiment, metadata storage program 116 resides on computing device 104 and stores device metadata from, for example, smart illumination device 110, in the associated image file in database 120. In another embodiment, metadata storage program 116 resides on computing device 104 and stores device metadata in a unique metadata file that is associated with the image file. In yet another embodiment, metadata storage program 116 resides on lighting controller 108 and records the device metadata in the image file stored in memory that resides in lighting controller 108. In yet another embodiment, metadata storage program 116 resides on camera 106 and records the device metadata in the image file stored in memory that resides in camera 106.

Figure 3:
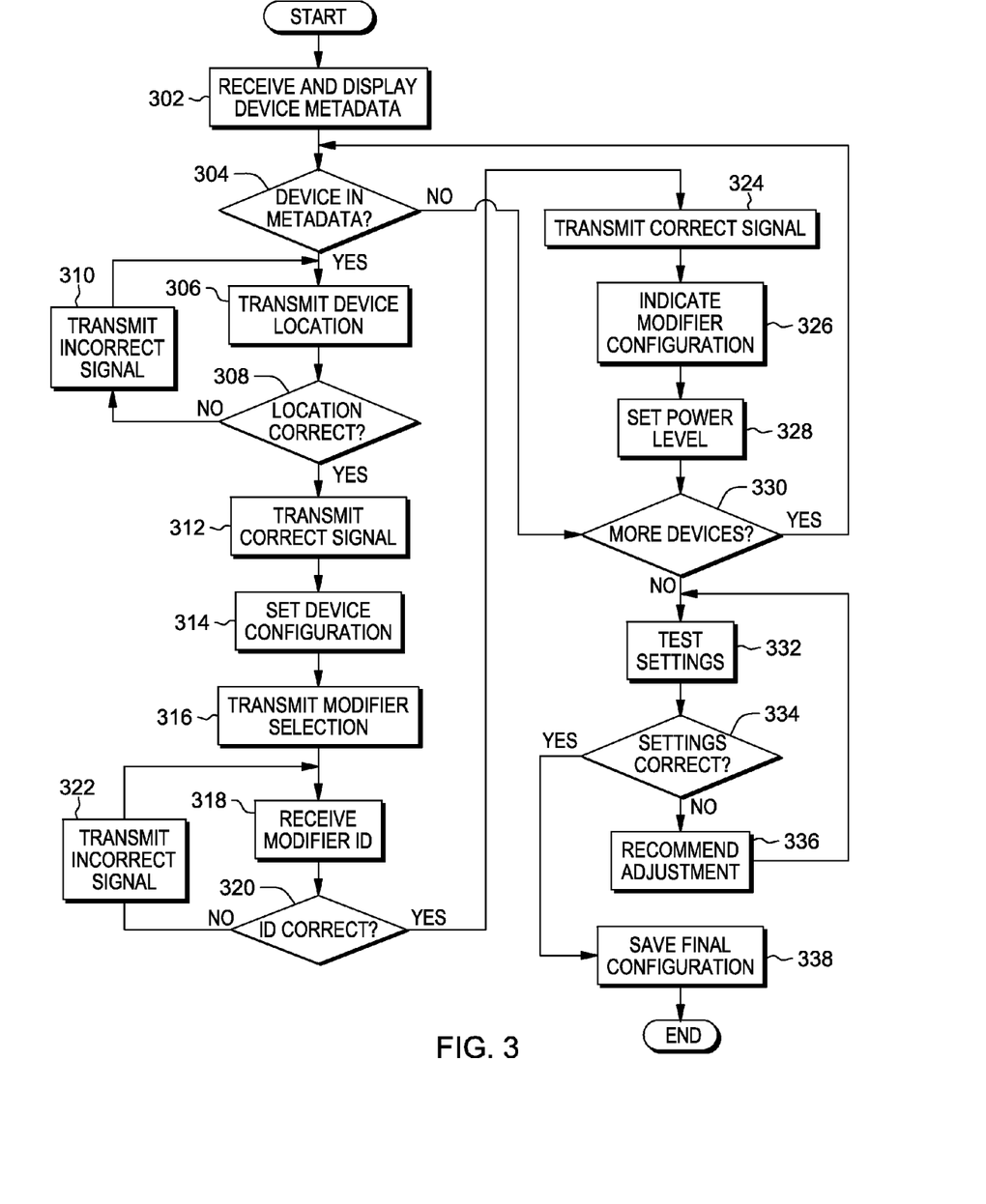
FIG. 3 illustrates operational steps of a lighting configuration program within the photographic setup environment of FIG. 1, for configuring a photographic setup based on stored image metadata, in accordance with an embodiment of the present invention.

FIG. 3 illustrates operational steps of a lighting configuration program within the photographic setup environment of FIG. 1, for configuring a photographic setup based on stored image metadata, in accordance with an embodiment of the present invention. The stored image metadata may be from a file that includes a simulation of a photographic setup or from a file that includes the metadata of a previously captured image.

Lighting configuration program 118 receives and displays device metadata (step 302). In an exemplary embodiment, lighting configuration program 118 receives device metadata from computing device 104. In another embodiment, lighting configuration program 118 receives device metadata from lighting controller 108. In yet another embodiment, lighting configuration program 118 receives device metadata from camera 106.

The device metadata includes information regarding the placement, orientation and configuration of each illumination device and scene modifier in a photographic setup. Lighting configuration program 118 utilizes the device metadata to display a virtual layout of the photographic setup, including illumination devices and scene modifiers. Lighting configuration program 118 may also display a list of the devices included in the photographic setup. In an exemplary embodiment, lighting configuration program 118 displays the photographic setup and/or list on computing device 104. In another embodiment, lighting configuration program 118 may display the photographic setup and/or list on camera 106. In yet another embodiment, lighting configuration program 118 may display the photographic setup and/or list on lighting controller 108. Lighting configuration program 118 may also display a wide angle photograph of the photographic setup if the photograph was taken at a previous shoot and is included in the device metadata.

Subsequent to receiving the device metadata, lighting configuration program 118 analyzes the device metadata to determine whether each device present, for example, smart illumination device 110, is included in the photographic setup represented by the device metadata (decision block 304). If smart illumination device 110 is not included in the device metadata (no branch, decision block 304), lighting configuration program 118 determines whether there are more devices present that are required in the photographic setup based on the device metadata (decision block 330).

If smart illumination device 110 is included in the device metadata (yes branch, decision block 304), lighting configuration program 118 transmits the location of smart illumination device 110 in the photographic setup (step 306). Lighting configuration program 118 determines location using, for example, radio or light from other devices and/or camera 106 for triangulation, by using a global positioning system (GPS), or relative distance from camera 106 or the subject.

In some embodiments, if lighting configuration program 118 determines device location based on distance from the subject of the photographic setup, and the subject is not available at the time of the setup, another device may be used as a proxy for the subject. The subject proxy device marks the position of the subject and allows rapid placement of illumination devices and scene modifiers relative to the subject.

In an exemplary embodiment, lighting configuration program 118 prompts the user to place smart illumination device 110 in a particular location by emitting audible or visual cues. For example, smart illumination device 110 may flash at varying frequencies, depending on how close or far smart illumination device 110 is from its intended location.

Lighting configuration program 118 determines whether smart illumination device 110 is in the correct location, based on the device metadata (decision block 308). For example, lighting configuration program 118 may compare the location noted in the device metadata to the coordinates of smart illumination device 110 received from a GPS and determine whether the two datasets match. If smart illumination device 110 in not in the correct location (no branch, decision block 308), lighting configuration program 118 transmits a signal to indicate that smart illumination device 110 is in the wrong location (step 310). For example, lighting configuration program 118 may transmit a signal for smart illumination device 110 to emit a high frequency flash, indicating its position is incorrect.

In another example, lighting configuration program 118 may transmit a signal for smart illumination device 110 to emit a high frequency audible tone, indicating its position is incorrect. In an exemplary embodiment, smart illumination device 110 includes servos that can move smart illumination device 110 from one location to another. In another embodiment, the user manually moves smart illumination device 110 from one location to another.

Once smart illumination device 110 is in the correct location (yes branch, decision block 308), lighting configuration program 118 transmits a signal to indicate that smart illumination device 110 is in the correct location (step 312). For example, lighting configuration program 118 may transmit a signal for smart illumination device 110 to illuminate a green indicator light, indicating its position is correct. In another example, lighting configuration program 118 may transmit a signal for smart illumination device 110 to emit a low frequency audible tone, indicating its position is correct.

Lighting configuration program 118 sets the device configuration of smart illumination device 110 based on the device metadata (step 314). According to the configuration information contained in the device metadata, lighting configuration program 118 sets the configuration attributes of smart illumination device 110. The configuration attributes of smart illumination device 110 can include, for example, intensity, zoom level, and orientation, such as direction or angle, with respect to camera 106. The device metadata describes the precise configuration of each applicable attribute, and lighting configuration program 118 sets the attributes of smart illumination device 110 to match the configuration of the attributes in the device metadata.

Lighting configuration program 118 transmits a modifier selection (step 316). If the device metadata indicates that a scene modifier is attached to smart illumination device 110, lighting configuration program 118 transmits a signal to identify the selected scene modifier indicated by the device metadata. In an exemplary embodiment, where the selected scene modifier includes an electronic ID tag, lighting configuration program 118 transmits a signal to the electronic ID tag on the selected scene modifier, and the electronic ID tag indicates that the scene modifier to which it is attached is the selected scene modifier. In another embodiment, smart illumination device 110 includes a display, and lighting configuration program 118 displays the selected scene modifier. Examples of scene modifiers that can be attached to illumination devices include gels, filters and soft boxes.

Upon attachment of the selected scene modifier to smart illumination device 110, lighting configuration program 118 receives the modifier identification (step 318). If more than one scene modifier is indicated by the device metadata, lighting configuration program 118 receives modifier identification for each indicated scene modifier. In an exemplary embodiment, where the selected scene modifier includes an electronic ID tag, lighting configuration program 118 receives a signal from the electronic ID tag on the selected scene modifier, which identifies the selected scene modifier. In another embodiment, the user may indicate the scene modifier identification to lighting configuration program 118 by choosing it from a list displayed on smart illumination device 110.

Subsequent to receiving the scene modifier identification, lighting configuration program 118 determines whether the attached scene modifier is correct, based on the device metadata (decision block 320). If the attached scene modifier is not correct (no branch, decision block 320), lighting configuration program 118 transmits a signal to indicate that the incorrect scene modifier is attached (step 322). For example, in an embodiment where smart illumination device 110 includes a display, lighting configuration program 118 displays a message to the user that an incorrect scene modifier is attached. In another example, lighting configuration program 118 may emit a high frequency flash to indicate that an incorrect scene modifier is attached.

If the attached scene modifier is correct (yes branch, decision block 320), lighting configuration program 118 transmits a signal to indicate that the correct scene modifier is attached (step 324). For example, in an embodiment where smart illumination device 110 includes a display, lighting configuration program 118 displays a message to the user that the correct scene modifier is attached. In another example, lighting configuration program 118 may transmit a signal for smart illumination device 110 to illuminate a green indicator light, indicating the correct scene modifier is attached.

Subsequent to the correct scene modifier attachment to smart illumination device 110, lighting configuration program 118 indicates the modifier configuration, based on the device metadata (step 326). Depending on the scene modifier, different configurations may be available. For example, a light may need to be "flagged", or covered, on one side or the other, in which case lighting configuration program 118 indicates which side of illumination device 110 to flag.

In an embodiment in which smart illumination device 110 includes a display, lighting configuration program 118 displays the scene modifier configuration, allowing the user to properly configure the scene modifier. In another embodiment, where the scene modifier is enabled with electronics to set its own configuration and is connected to smart illumination device 110 via network 102, lighting configuration program 118 transmits a signal to scene modifier 114 that indicates the proper configuration for scene modifier 114 based on the device metadata.

Lighting configuration program 118 sets the power level of smart illumination device 110 (step 328). Although the device metadata includes information regarding the settings and configuration of smart illumination device 110, lighting configuration program 118 may need to adjust the power level of smart illumination device 110 to compensate for variations between the actual photographic setup and the device metadata. The device metadata may have been generated by a simulation of the photographic setup, and variations in ambient light, room size, etc. can result in differences between the simulated image and the real image. Lighting configuration program 118 sets the power level of smart illumination device 110 to account for any variations detected in the photographic setup.

Subsequent to completion of the configuration of smart illumination device 110, including power level setting and scene modifier attachment and configuration, lighting configuration program 118 determines whether there are more devices present that are required in the photographic setup based on the device metadata (decision block 330). If one or more additional devices are present (yes branch, decision block 330), lighting configuration program 118 returns to step 304 to continue the configuration of the photographic setup.

Subsequent to the completion of the configuration of all devices in the photographic setup (no branch, decision block 330), lighting configuration program 118 tests the settings (step 332). Lighting configuration program 118 activates each device as defined by the device metadata and compares the actual configuration values to the configuration defined by the device metadata. Lighting configuration program 118 then determines if the settings are correct (decision block 334). A pre-defined tolerance, for the comparison of the actual configuration values to the configuration defined by the device metadata, is included in lighting configuration program 118.

In an exemplary embodiment, lighting configuration program 118 displays a map of all of the devices included in the photographic setup, including whether each device is powered on, in the correct location and configured correctly. If the settings are not correct, within the pre-defined tolerance (no branch, decision block 334), lighting configuration program 118 recommends adjustments to the configuration (step 336). For example, in an embodiment where smart illumination device 110 includes a display, lighting configuration program 118 displays a message to the user to adjust the power or intensity of smart illumination device 110 in order to better match the device metadata configuration. In another embodiment, lighting configuration program 118 automatically adjusts attribute settings on smart illumination device 110 to better match the device metadata. In another example, lighting configuration program 118 may indicate that adjustment to a scene modifier is required to better match the device metadata.

As adjustments are made, lighting configuration program 118 continues to test the settings and determine whether they are correct. Subsequent to determining that the settings are correct (yes branch, decision block 334), lighting configuration program 118 saves the final configuration in database 120 (step 338). The final configuration may then be used in another photographic setup at a later date. The final configuration may also be used as a starting point for a simulation of a photographic setup.

Figure 4:
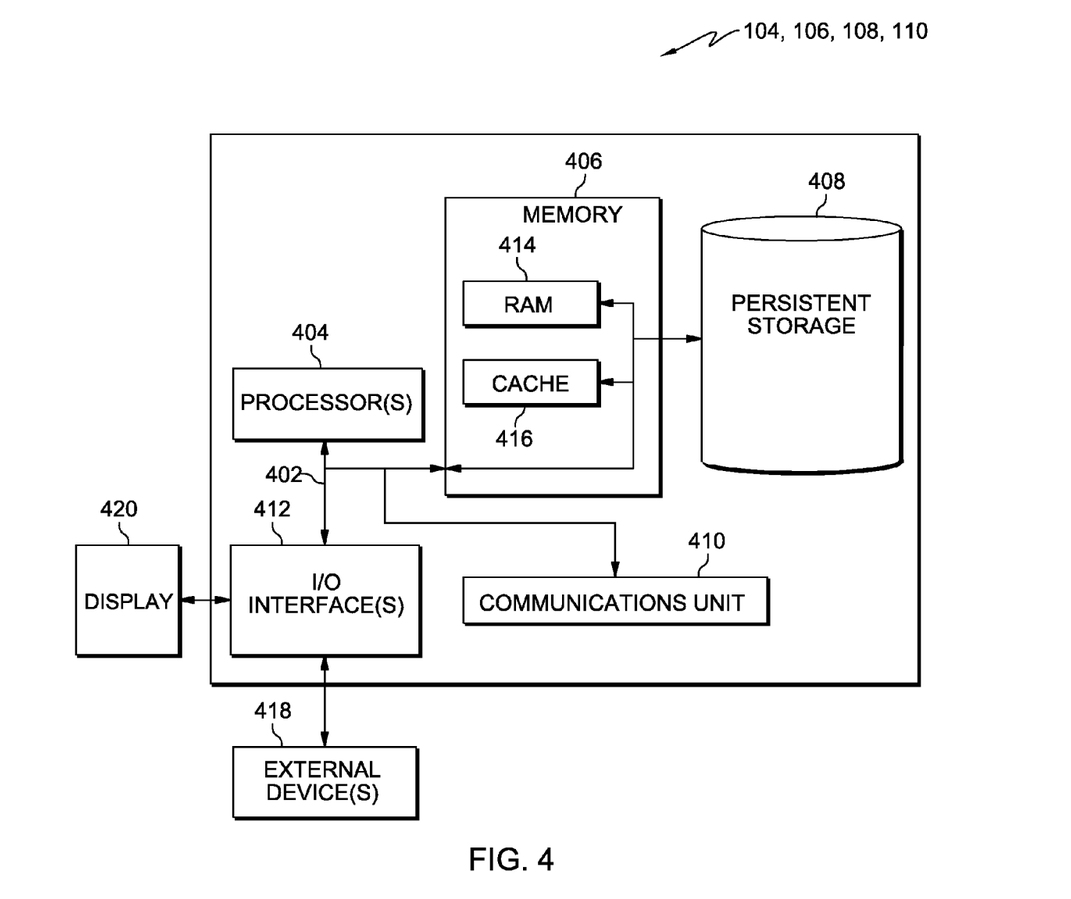
FIG. 4 depicts a block diagram of components of the computing device of FIG. 1, in accordance with an embodiment of the present invention.

FIG. 4 depicts a block diagram of components of computing device 104, camera 106, lighting controller 108, and smart illumination device 110 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 104, camera 106, lighting controller 108, and smart illumination device 110 each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Metadata storage program 116, lighting configuration program 118, and database 120 are stored in memory 406 or persistent storage 408 of computing device 104 for execution and/or access by one or more of the respective computer processors 404 of computing device 104 via one or more memories of memory 406 of computing device 104. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Metadata storage program 116, lighting configuration program 118, and database 120 may be downloaded to persistent storage 408 of computing device 104 through communications unit 410 of computing device 104.

I/O interface(s) 412 allows for input and output of data with other devices that may be connected to computing device 104 and/or smart illumination device 110. For example, I/O interface(s) 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, for example, metadata storage program 116, lighting configuration program 118, and database 120 on computing device 104 can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for collecting and storing photographic device metadata, the method comprising:
    a computer receiving a file containing an image;
    the computer receiving photographic device metadata associated with the image from one or more photographic devices, wherein the one or more photographic devices includes at least one or more illumination devices, and wherein the one or more photographic devices are utilized to create the image, and wherein the received photographic device metadata includes at least a plurality of attributes of the one or more photographic devices, and wherein the photographic device metadata describes a photographic setup at a time the image is created, the photographic setup including at least an illumination device; and
    the computer storing the received photographic device metadata in association with the received file.

2. The method of claim 1, wherein the one or more photographic devices further includes scene modifiers, wherein a scene modifier is an object capable of modifying a photographic setup and includes at least a gel, a filter, a soft box, an umbrella, a prop, and a subject.

3. The method of claim 1, wherein photographic device metadata from the one or more photographic devices includes one or more of: a placement position, a direction, an orientation, an angle, a manufacturer, a model, a zoom level, an intensity, a power, a modifier type, a gel color code, and a gel transmissive index.

4. The method of claim 1, further comprising:
    a first photographic device of the one or more photographic devices detecting one or more scene modifiers;
    the first photographic device determining a configuration of the one or more scene modifiers, based, at least in part, on the photographic device metadata; and
    the first photographic device transmitting the configuration to the one or more scene modifiers.

5. The method of claim 4, wherein photographic device metadata received from the first photographic device further includes a plurality attributes of one or more scene modifiers, and wherein the photographic device metadata can be utilized to configure a photographic setup.

6. A computer program product for collecting and storing photographic device metadata, the computer program product comprising:
    one or more computer-readable storage media and program instructions stored on the one or more computer-readable storage media, the program instructions comprising:
    program instructions to receive a file containing an image;
    program instructions to receive photographic device metadata associated with the image from one or more photographic devices, wherein the one or more photographic devices includes at least one or more illumination devices, and wherein the one or more photographic devices are utilized to create the image, and wherein the received photographic device metadata includes at least a plurality of attributes of the one or more photographic devices, and wherein the photographic device metadata describes a photographic setup at a time the image is created, the photographic setup including at least an illumination device; and
    program instructions to store the received photographic device metadata in association with the received file.

7. The computer program product of claim 6 wherein the one or more photographic devices further includes scene modifiers, wherein a scene modifier is an object capable of modifying a photographic setup and includes at least a gel, a filter, a soft box, an umbrella, a prop, and a subject.

8. The computer program product of claim 6, wherein photographic device metadata from the one or more photographic devices includes one or more of: a placement position, a direction, an orientation, an angle, a manufacturer, a model, a zoom level, an intensity, a power, a modifier type, a gel color code, and a gel transmissive index.

9. The computer program product of claim 6, further comprising:
   a first photographic device of the one or more photographic devices detecting one or more scene modifiers;
   the first photographic device determining a configuration of the one or more scene modifiers, based, at least in part, on the photographic device metadata; and
   the first photographic device transmitting the configuration to the one or more scene modifiers.

10. The computer program product of claim 9, wherein photographic device metadata received from the first photographic device further includes a plurality attributes of one or more scene modifiers, and wherein the photographic device metadata can be utilized to configure a photographic setup.

11. A computer system for collecting and storing photographic device metadata, the system comprising:
   one or more computer processors;
   one or more computer-readable storage media;
   program instructions stored on at least one of the one or more computer-readable storage media for execution by at least one of the one or more computer processors, the program instructions comprising:
   program instructions to receive a file containing an image;
   program instructions to receive photographic device metadata associated with the image from one or more photographic devices, wherein the one or more photographic devices includes at least one or more illumination devices, and wherein the one or more photographic devices are utilized to create the image, and wherein the received photographic device metadata includes at least a plurality of attributes of the one or more photographic devices, and wherein the photographic device metadata describes a photographic setup at a time the image is created, the photographic setup including at least an illumination device; and
   program instructions to store the received photographic device metadata in association with the received file.

12. The computer system of claim 11, wherein the one or more photographic devices further includes scene modifiers, wherein a scene modifier is an object capable of modifying a photographic setup and includes at least a gel, a filter, a soft box, an umbrella, a prop, and a subject.

13. The computer system of claim 11, wherein photographic device metadata from the one or more photographic devices includes one or more of: a placement position, a direction, an orientation, an angle, a manufacturer, a model, a zoom level, an intensity, a power, a modifier type, a gel color code, and a gel transmissive index.

14. The computer system of claim 11, further comprising:
   a first photographic device of the one or more photographic devices detecting one or more scene modifiers;
   the first photographic device determining a configuration of the one or more scene modifiers, based, at least in part, on the photographic device metadata; and
   the first photographic device transmitting the configuration to the one or more scene modifiers.

15. The computer program product of claim 14, wherein photographic device metadata received from the first photographic device further includes a plurality attributes of one or more scene modifiers, and wherein the photographic device metadata can be utilized to configure a photographic setup.

16. The method of claim 5, wherein configuring a photographic setup comprises:
   the computer determining, based, at least in part, on the photographic device metadata, whether at least one photographic device is included in the photographic setup;
   responsive to determining the at least one photographic device is included in the photographic setup, the computer transmitting a location of the at least one photographic device in the photographic setup;
   the computer determining whether the at least one photographic device is in the location; and
   responsive to determining the at least one photographic device is in the location, the computer setting a configuration of the at least one photographic device, based, at least in part, on the photographic device metadata.

17. The method of claim 6, wherein the computer determining whether the at least one photographic device is in the location further comprises the computer transmitting a signal to indicate whether the at least one photographic device is in the location, wherein the signal indicates a correct location or an incorrect location.

* * * * *